United States Patent
Zia et al.

(10) Patent No.: US 7,565,639 B2
(45) Date of Patent: *Jul. 21, 2009

(54) INTEGRATED ASSIST FEATURES FOR EPITAXIAL GROWTH BULK TILES WITH COMPENSATION

(75) Inventors: Omar Zia, Austin, TX (US); Nigel Cave, Austin, TX (US); Venkat Kolagunta, Austin, TX (US); Ruiqi Tian, Austin, TX (US); Edward O. Travis, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 11/650,254

(22) Filed: Jan. 4, 2007

(65) Prior Publication Data

US 2008/0168417 A1      Jul. 10, 2008

(51) Int. Cl.
  *G06F 17/50*  (2006.01)
(52) U.S. Cl. .............................. 716/19; 716/20; 716/21; 703/14; 430/5; 438/481
(58) Field of Classification Search ............. 716/19–21; 703/14; 430/5; 438/481
  See application file for complete search history.

(56) References Cited

U.S. PATENT DOCUMENTS

| | | | |
|---|---|---|---|
| 5,278,105 A | | 1/1994 | Eden et al. |
| 5,636,133 A * | | 6/1997 | Chesebro et al. ............... 716/4 |
| 6,093,631 A | | 7/2000 | Jaso et al. |
| 6,305,000 B1 * | | 10/2001 | Phan et al. ..................... 716/5 |
| 6,323,113 B1 | | 11/2001 | Gabriel et al. |
| 6,593,226 B2 | | 7/2003 | Travis et al. |
| 6,611,045 B2 | | 8/2003 | Travis et al. |
| 6,614,062 B2 | | 9/2003 | Chheda et al. |
| 6,703,187 B2 * | | 3/2004 | Sheu et al. .................. 430/314 |
| 6,764,919 B2 | | 7/2004 | Yu et al. |
| 6,905,967 B1 | | 6/2005 | Tian et al. |
| 6,948,146 B2 | | 9/2005 | Allen et al. |
| 7,103,863 B2 | | 9/2006 | Riepe et al. |
| 7,409,327 B2 * | | 8/2008 | Deliwala ...................... 703/14 |
| 2002/0029372 A1 * | | 3/2002 | Lee .............................. 716/19 |
| 2005/0097490 A1 | | 5/2005 | Travis et al. |
| 2005/0133832 A1 | | 6/2005 | Murthy et al. |
| 2006/0228850 A1 * | | 10/2006 | Tsai et al. .................... 438/219 |
| 2008/0135877 A1 * | | 6/2008 | Inoue et al. .................. 257/192 |
| 2008/0168418 A1 * | | 7/2008 | Zia et al. ...................... 716/20 |

* cited by examiner

*Primary Examiner*—Vuthe Siek
*Assistant Examiner*—Naum B Levin
(74) *Attorney, Agent, or Firm*—John A. Fortkort; Fortkort & Houston P.C.

(57) ABSTRACT

A method for making a semiconductor device is provided which comprises (a) creating a first data set (301) which defines a first set of tiles (303) for a trench chemical mechanical polishing (CMP) process; (b) deriving a first trench CMP mask set (307) and a first epitaxial growth mask set (309) from the first data set, wherein the first epitaxial growth mask set is derived from the first data set by removing a subset (305) of the tiles defined by the first data set and incorporating the subset of tiles into the first epitaxial growth mask set; and (c) reconfiguring the first trench CMP mask set to account for the first epitaxial growth mask set, thereby defining a second trench CMP mask set (308).

20 Claims, 8 Drawing Sheets

US 7,565,639 B2

INTEGRATED ASSIST FEATURES FOR EPITAXIAL GROWTH BULK TILES WITH COMPENSATION

FIELD OF THE DISCLOSURE

The present application relates generally to semiconductor fabrication processes and, more particularly, to semiconductor fabrication processes in which structural tiles are selectively incorporated into one or more layers of the device to improve process uniformity.

BACKGROUND OF THE DISCLOSURE

The characteristics of certain semiconductor fabrication processes are found to vary considerably from one device to another. For example, the rate and uniformity of chemical mechanical planarization (CMP) techniques employed in conjunction with shallow trench isolation (STI) processes varies considerably as a function of feature pattern density. As a result, the application of such trench CMP processes to substrates that contain active regions of different population densities can give rise to significant and undesirable non-uniformities in topography.

This problem is sometimes addressed through the incorporation of dummy features or "tiles" into less populated active regions of a semiconductor device so as to even out the pattern density between the two regions, thereby achieving greater process uniformity in the trench CMP process. Such dummy features or tiles are typically placed in the "white space" between active device features, and are thus independent of the circuit design of the semiconductor device.

The characteristics of epitaxial growth processes are also found to vary significantly with pattern density. For example, when epitaxial growth processes are used to form silicon germanium alloy films on CMOS substrates, the growth rate, quality, composition and thickness of the resulting films are all highly sensitive to pattern density.

Some attempts have been made in the art to compensate for the effect of pattern density on epitaxial growth. For example, in one known approach, a fraction of the active tiles used to control topographical uniformity in the chemical mechanical polishing (CMP) attendant to shallow trench isolation (STI) are reused for density matching in subsequent epitaxial growth processes. However, this approach is found to produce suboptimal results in terms of compensating for differences in pattern densities during epitaxy.

There is thus a need in the art for a process which overcomes the aforementioned infirmities. In particular, there is a need in the art for a tiling scheme which addresses the needs of both trench CMP and epitaxy. These and other needs may be addressed with the methodologies and devices described herein.

DETAILED DESCRIPTION

Figure 1:
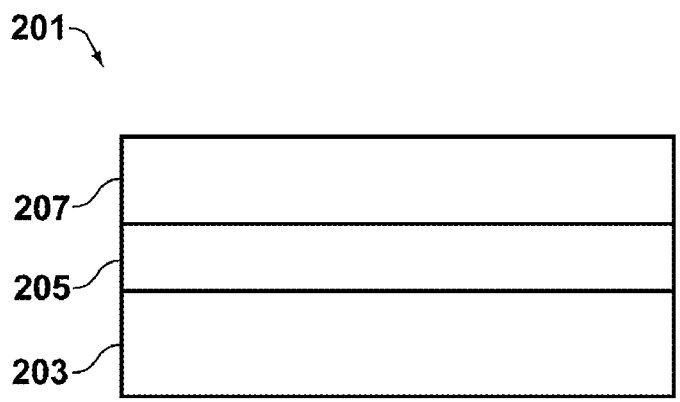
FIG. 1 is an illustration of a step in a semiconductor fabrication process in accordance with the teachings herein.

In one aspect, a method for making a semiconductor device is provided which comprises (a) creating a first data set which defines a first set of tiles for a trench chemical mechanical polishing (CMP) process; (b) deriving a first trench CMP mask set and a first epitaxial growth mask set from the first data set, wherein the first epitaxial growth mask set is derived from the first data set by removing a subset of the tiles defined by the first data set and incorporating the subset of tiles into the first epitaxial growth mask set; and (c) reconfiguring the first trench CMP mask set to account for the first epitaxial growth mask set, thereby defining a second trench CMP mask set.

In another aspect, a method for making a semiconductor device is provided which comprises (a) creating a first data set which defines a first set of tiles optimized for a trench chemical mechanical polishing (CMP) process; (b) deriving a first trench CMP mask set and a first epitaxial growth mask set from the first data set, wherein the first epitaxial growth mask set is derived from the first data set by removing a subset of the tiles defined by the first data set and incorporating the subset of tiles into the first epitaxial growth mask set; and (c) re-optimizing the first trench CMP mask by adjusting the dimensions of some of the tiles defined therein.

It has now been found that the aforementioned needs may be met through the provision of a tiling strategy which incorporates a first mask set which includes a first set of tiles that have been optimized for a chemical mechanical polishing (CMP) process, and a second mask set which includes a second set of tiles for an epitaxial growth process. The second mask set, which may be optimized for the epitaxial growth process, is derived by removing a subset of tiles from the first mask set and incorporating those tiles into the second mask set. In some embodiments, the reallocated tiles may also be reoriented, or their dimensions may be adjusted. After the second set of tiles is formed, the first mask set may then be re-optimized or otherwise reconfigured to account for the loss of tiles and/or the presence or configuration of adjacent epitaxial tiles. This may be accomplished, for example, by adjusting the dimensions of those tiles in the set of tiles which are adjacent to tiles of the second set so as to achieve or restore a desired feature density.

Unlike approaches in which a fraction of the active tiles used for trench CMP are merely reused for density matching in epitaxy, the approach described herein permits the needs of trench CMP to be decoupled from those of epitaxial growth processes. For example, such an approach allows the epitaxial tiles to be oriented so as to favor certain desired growth rates and facets, thereby allowing silicon overburden and epitaxial CMP characteristics to be tailored independently of the needs imposed by trench CMP. Consequently, this approach allows both global and local pattern density effects to be adequately compensated for.

The methodology disclosed herein may be further appreciated with respect to FIGS. 1-8, which disclose a first particular, non-limiting embodiment of a process in accordance with the teachings herein. With reference to FIG. 1, a structure 201 is provided which comprises a substrate 203 which preferably comprises (110) silicon and upon which is disposed a buried oxide (BOX) layer 205 and an SOI layer 207, the later of which preferably comprises (100) silicon.

Figure 2:
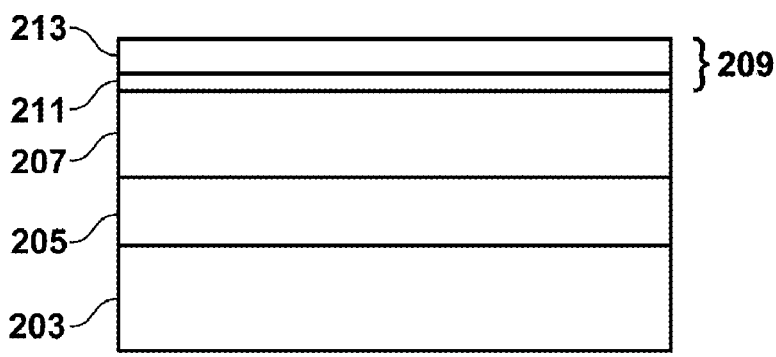
FIG. 2 is an illustration of a step in a semiconductor fabrication process in accordance with the teachings herein.
Figure 3:
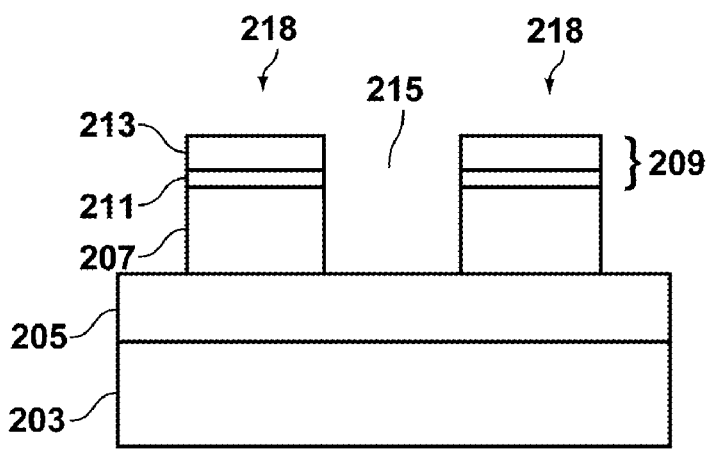
FIG. 3 is an illustration of a step in a semiconductor fabrication process in accordance with the teachings herein.

As shown in FIG. 2, a hard mask 209 is then formed over the structure. The hard mask 209 comprises a layer of oxide 211 over which is deposited a layer of nitride 213. As shown in FIG. 3, the hard mask 209 is then patterned to expose a portion of the underlying SOI layer 207, and the exposed portion of the SOI layer 207 is removed by etching to define a first trench 215 therein which extends to the BOX layer 205. The BOX layer 205 may be used as an etch stop in this process. In inactive regions of the device, the resulting structures 218 form by the etch are the CMP tiles.

Figure 4:
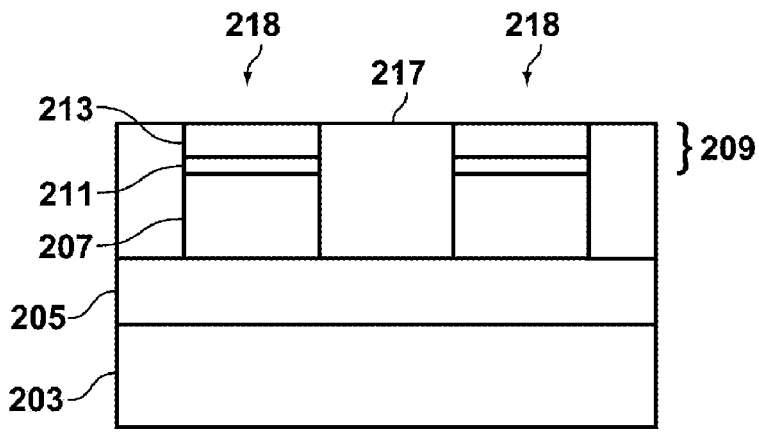
FIG. 4 is an illustration of a step in a semiconductor fabrication process in accordance with the teachings herein.

Referring now to FIG. 4, the first trench 215 is then backfilled with a suitable oxide 217. This oxide deposition is preferably followed by CMP so that the oxide 217 is coplanar with the hard mask 209.

Figure 5:
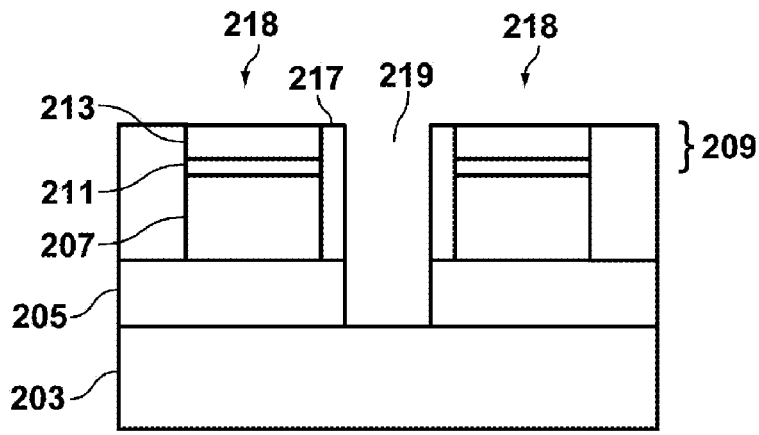
FIG. 5 is an illustration of a step in a semiconductor fabrication process in accordance with the teachings herein.

Next, as shown in FIG. 5, a second trench 219 is created within the backfilled oxide 217 which exposes a portion of the substrate 203. A suitable oxide etch may be used for this purpose. In inactive regions of the device, the exposed portions of the substrate form the epitaxial tiles.

Figure 6:
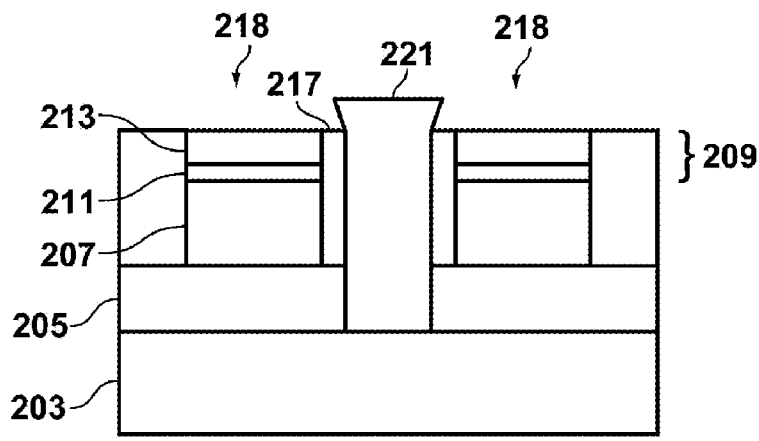
FIG. 6 is an illustration of a step in a semiconductor fabrication process in accordance with the teachings herein.

As shown in FIG. 6, the second trench 219 is then filled with epitaxial material 221 through epitaxial growth of the (110) substrate 203. The epitaxial material 221 is grown to a height above the masking layer 209. This height is referred to as the silicon overburden. During the epitaxial growth process, the backfilled oxide 217 within the trench prevents lateral growth of the SOI layer 207. In addition to ensuring the monocrystallinity of the resulting epitaxial growth, this also prevents the formation of stress fracture regions which might otherwise form along intersections of the crystal propagation fronts.

Figure 7:
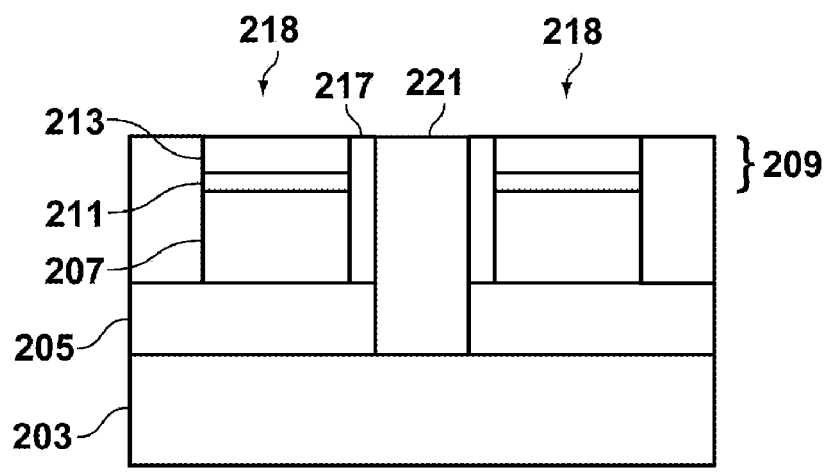
FIG. 7 is an illustration of a step in a semiconductor fabrication process in accordance with the teachings herein.
Figure 8:
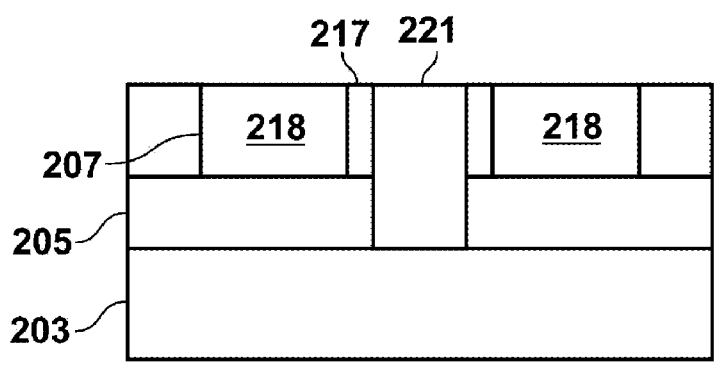
FIG. 8 is an illustration of a step in a semiconductor fabrication process in accordance with the teachings herein.

Referring now to FIG. 7, the epitaxial material 221 is subjected to CMP to planarize it with respect to the hard mask 209. The hard mask 209 is then stripped, and a portion of the exposed epitaxial material 221 is removed through a suitable etching process so that it is essentially planar with respect to the SOI silicon layer 207 as shown in FIG. 8. Such an etching process may comprise wet and/or dry etching or a combination of an oxidation and etching process.

Figure 9:
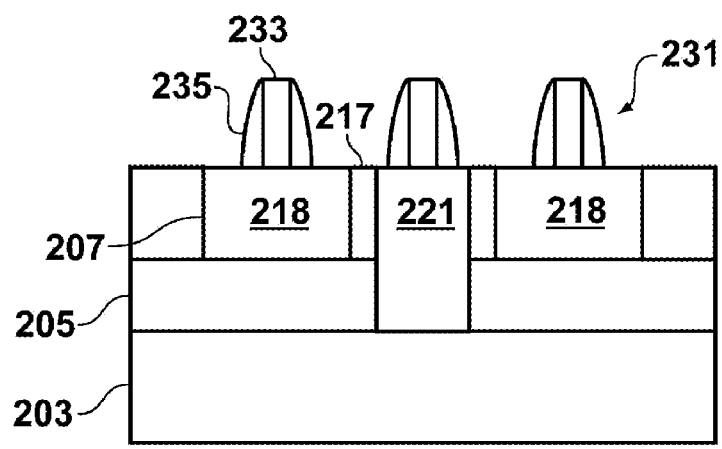
FIG. 9 is an illustration of a step in a semiconductor fabrication process in accordance with the teachings herein.

As shown in FIG. 9, the structure is then subjected to various processes typical of CMOS fabrication. These processes typically include the formation of gate structures 231, each of which will typically include a gate electrode 233 and spacer structures 235.

It will be appreciated that various modifications may be made to the foregoing process without departing from the scope of the teachings herein. For example, the hard masks used in the methodologies described herein may have various constructions and chemical compositions, and are not limited to oxide/nitride masks of the type depicted in the foregoing processes. In some embodiments, a suitable photo resist may be used in place of these hard masks. Moreover, the device may contain additional, or fewer, layers than those shown.

It will also be appreciated that the SOI silicon layer 207 and/or the silicon substrate 203 may be replaced in the foregoing process with germanium (Ge) or with silicon germanium (SiGe) alloys. Moreover, while it is preferred that the SOI silicon layer 207 has a (100) crystal orientation and that the substrate 203 has a (110) crystal orientation, the methodologies disclosed herein are not limited to any particular crystal orientation of either of these layers.

FIGS. 10-17 illustrate a particular, non-limiting embodiment of a tiling algorithm in accordance with the teachings herein. The algorithm of FIGS. 10-17 essentially comprises two phases. In the first phase, depicted in FIGS. 10-13, the initial active (STI) tiles are defined, and are preferably optimized for STI CMP. A subset of the active tiles are then reallocated for use as initial epitaxial tiles. This subset of tiles may be chosen to improve or optimize epitaxy, or may be reconfigured or re-oriented to improve or optimize epitaxy. In the second phase of the algorithm, depicted in FIGS. 14-17, the initial active (STI) tiles are then reconfigured or re-optimized to account for the reallocation of active tiles. In some embodiments, the initial epitaxial tiles may also be subsequently re-optimized or reconfigured.

Figure 10:
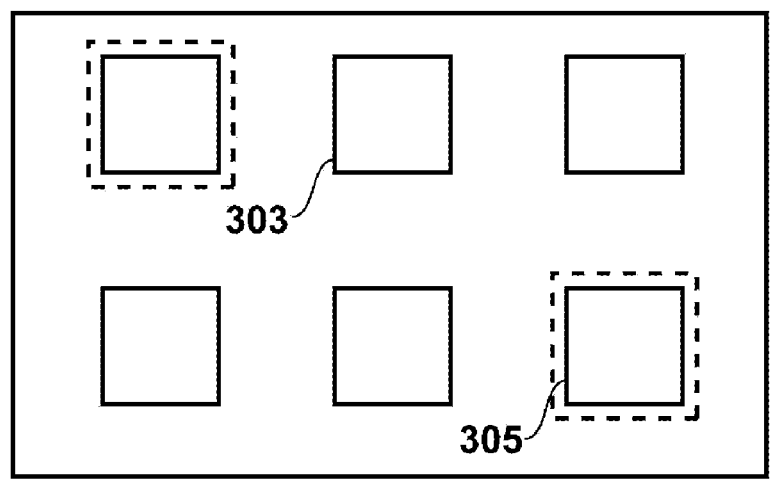
FIG. 10 is an illustration of an initial tiling data set with marker layers.
Figure 11:
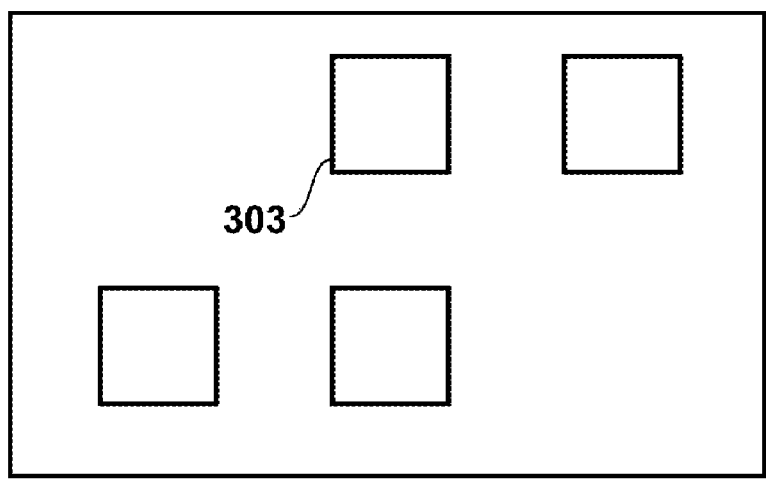
FIG. 11 is an illustration of an initial STI mask set.
Figure 12:
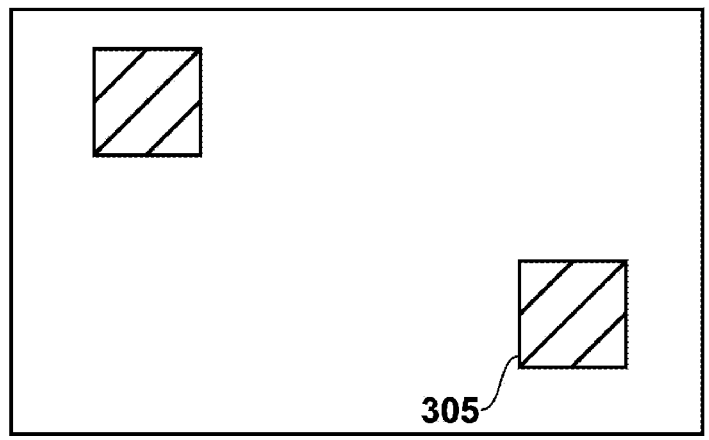
FIG. 12 is an illustration of an initial epitaxial mask set.
Figure 13:
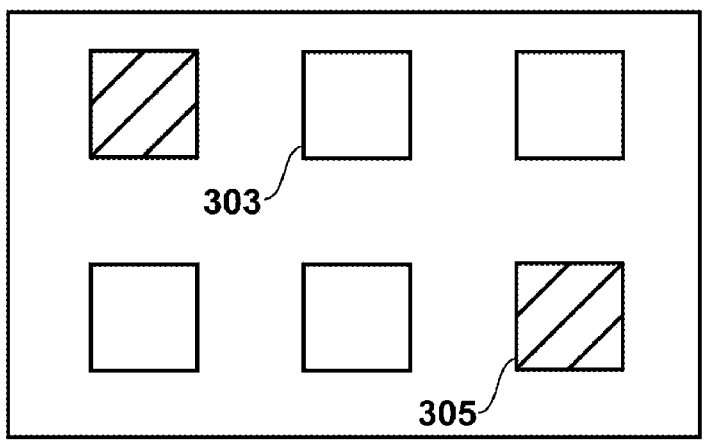
FIG. 13 is an illustration (top view) of a semiconductor device processed with the mask sets of FIGS. 11 and 12.

As shown in FIG. 10, an initial data set 301 is provided which defines an initial set of active (or trench CMP) tiles 303. As indicated by the dashed lines, a subset of the initial active tiles are selected and are reserved for use as initial epitaxial tiles 305. The selection may be performed using a "marker layer" in the tiled database. As indicated in FIG. 11, the selected tiles 305 thus do not show up in the initial trench CMP mask set 307, since they are still field oxide at this point in the process (see FIG. 4 of the foregoing process), while the active tiles are SOI. However, the selected tiles 305 do show up in the initial epitaxy mask set 309, as indicated in FIG. 12. Initial mask sets 307 and 309 are formed by the use of proper Boolean operations on the tile data and the marker data to exclude data set features from the initial trench CMP mask set 307 and include those features on the initial epitaxial mask set 309. FIG. 13 depicts a top view of a semiconductor device (corresponding to the stage in the process depicted in FIG. 8) as it would appear if processed with initial mask sets 307 and 309.

Upon completion of the first phase, the tiles for the initial epitaxy mask set 309 have been derived from the initial trench CMP mask set 307, and hence may or may not be optimized for epitaxy. Similarly, the initial trench CMP mask set 307 is typically no longer optimized for trench CMP, since a subset of the trench CMP tiles 303 have been removed from the initial trench CMP mask set 307. This issue is addressed in the subsequent optimization phase.

Figure 14:
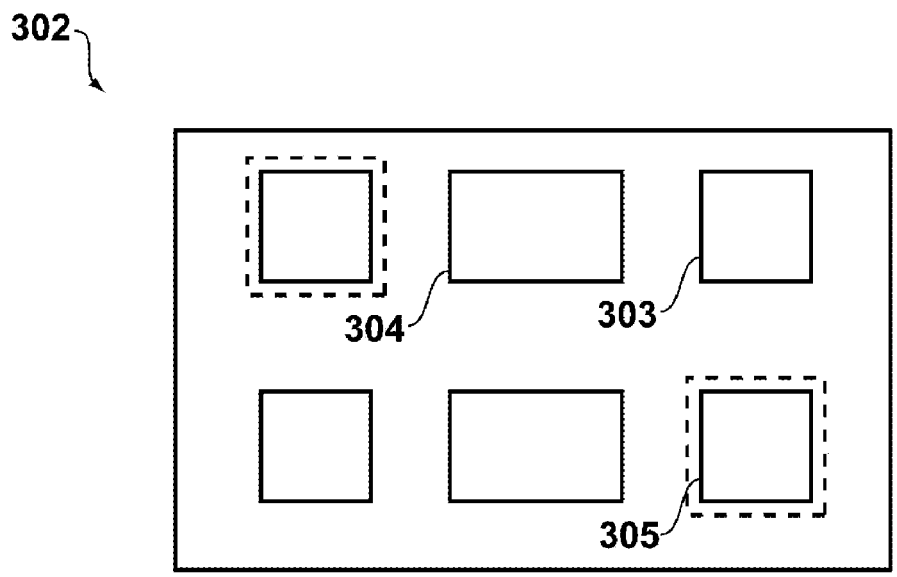
FIG. 14 is an illustration of a tiling data set with marker layers which has been re-optimized in accordance with the teachings herein.
Figure 15:
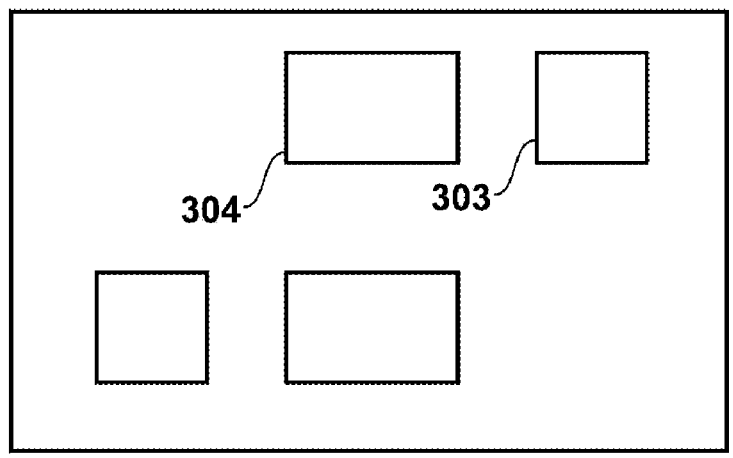
FIG. 15 is an illustration of an STI mask set which has been re-optimized in accordance with the teachings herein.
Figure 16:
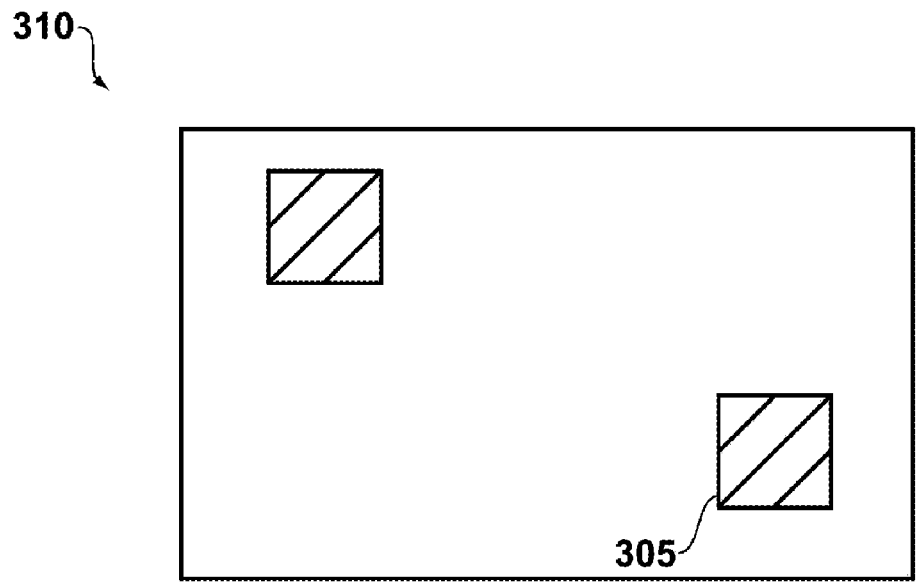
FIG. 16 is an illustration of an epitaxial mask set which has been re-optimized in accordance with the teachings herein.
Figure 17:
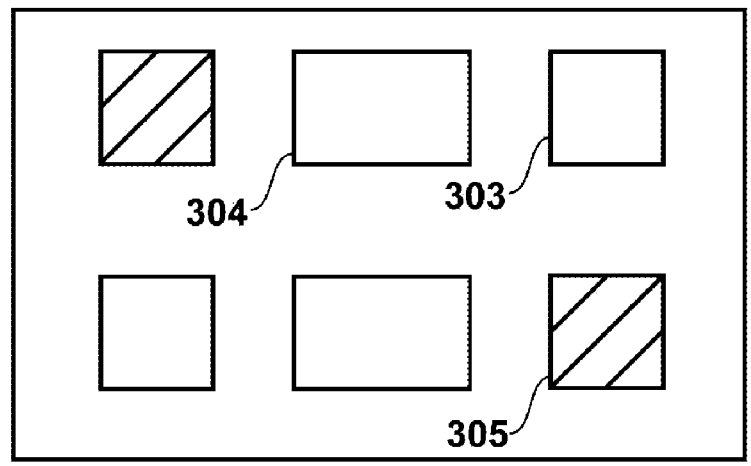
FIG. 17 is an illustration (top view) of a semiconductor device processed with the mask sets of FIGS. 15 and 16.

Referring now to FIG. 14, the trench CMP tiling data 302 is subsequently reconfigured or re-optimized by changing the dimensions of those trench CMP tiles 304 which are adjacent to the epitaxial tiles 305 so as to compensate for the tiles removed from the initial trench CMP mask set 307. The resulting re-optimized trench CMP mask set 308 and the final epitaxy mask set 310 are shown in FIGS. 15 and 16, respectively, as created through application of the correct set of Boolean operations on the tile and marker data. FIG. 17 shows the resultant surface of the wafer (corresponding to the stage in the process depicted in FIG. 8) following processing, indicating the location of both the trench CPM tiles 303, 304 and the epitaxial tiles 305.

The particular embodiment of the process depicted in FIGS. 10-17 illustrates the re-optimization or reconfiguration of only the initial trench CMP mask set 307. However, it will be appreciated that, in some embodiments, both mask sets may be re-optimized or reconfigured. Moreover, while the particular embodiment depicted in FIGS. 10-17 is implemented as a two-step process, one skilled in the art will appreciate that algorithms having more than two steps may be derived from the principles disclosed herein. In such algorithms, the optimization step may be repeated until the tiling density reaches an acceptable level for both the active tiles and the epitaxial tiles. In some embodiments, the re-optimization or reconfiguration step may also involve changes in the orientation, dimensions and/or shape of tiles. One such embodiment is described below.

Figure 18:
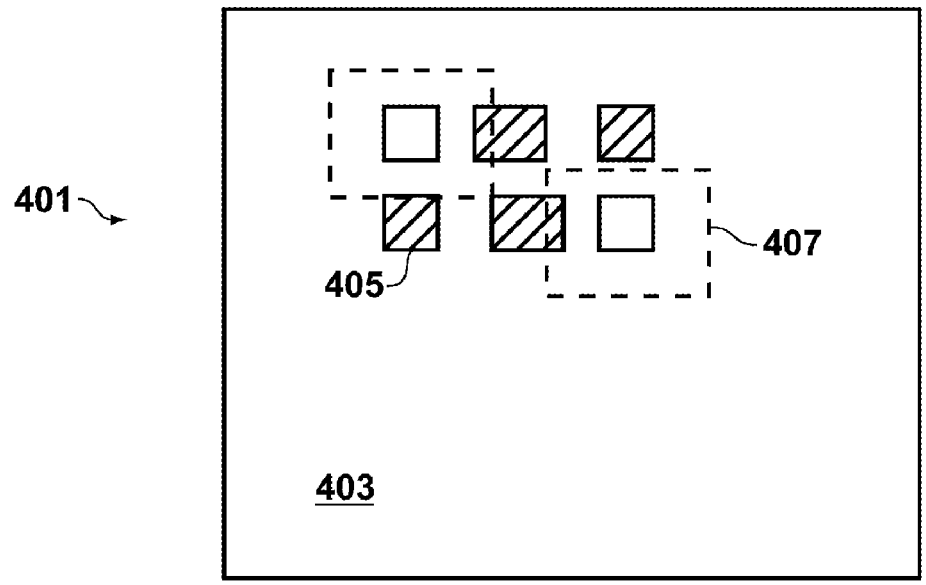
FIG. 18 illustrates the merging of tiles which can occur during epitaxy.

In designing a tiling scheme for epitaxial growth on a (110) bulk surface, lateral overgrowth is observed to happen at a faster rate than vertical growth. Moreover, the rate of overgrowth varies with direction, such that growth is preferred along certain crystallographic orientations. This phenomenon is depicted in FIG. 18. The structure 401 depicted therein comprises an SOI surface 403 upon which are disposed a plurality of STI CMP tiles 405 and a plurality of bulk epitaxial tiles 407. The dashed lines indicate the perimeter of the epitaxial tiles 407 after epitaxy. Depending on their proximity, it is thus possible for two epitaxial tiles 407 to merge during epitaxy, which can cause problems for the subsequent CMP.

Figure 19:
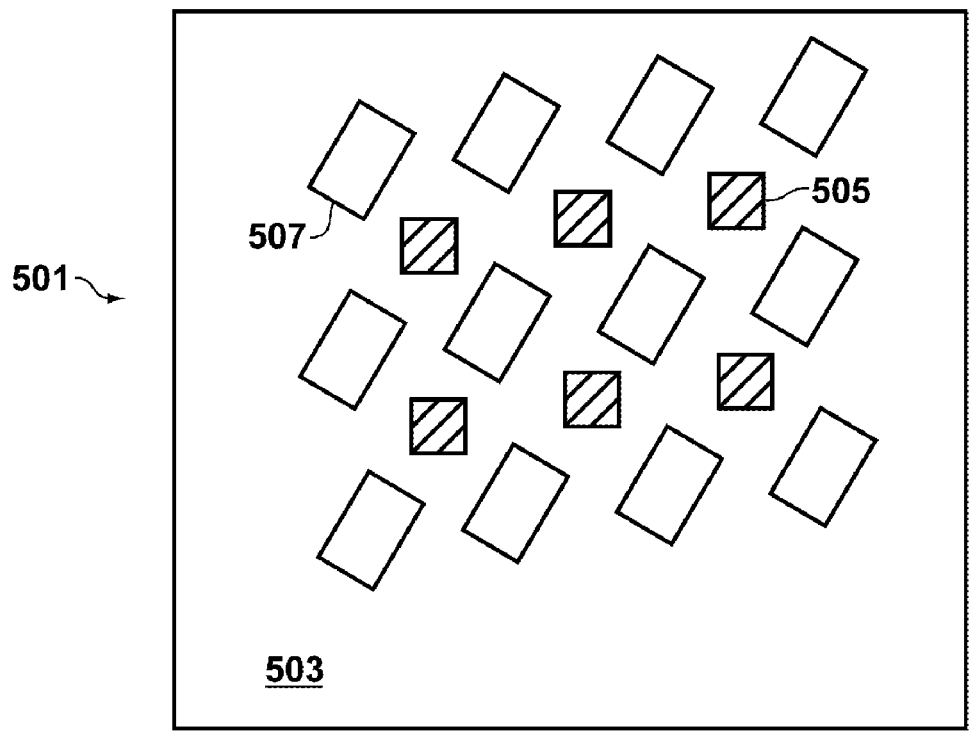
FIG. 19 illustrates a tiling strategy in which non-epitaxial tiles have been placed between epitaxial tiles to allow more room for overgrowth, and in which the orientation of the epitaxial tiles has been adjusted to effectively increase the distance between the epitaxial tiles in the direction of fastest growth.

One possible solution to this problem is illustrated in FIG. 19. The structure 501 depicted therein comprises an SOI surface 503 upon which are disposed a plurality of STI CMP tiles 505 and a plurality of bulk epitaxial tiles 507. However, in this embodiment, non-epitaxial tiles (in particular, the STI CMP tiles 505) have been placed between the epitaxial tiles 507, thereby allowing more room for overgrowth. Moreover, the orientation of the epitaxial tiles 507 has been adjusted to effectively increase the distance between the epitaxial tiles 507 in the direction of fastest growth. It will thus be appreciated that, by adjusting the orientation of the epitaxial tiles, the amount of silicon overburden may be tuned. Moreover, overgrowth issues and their impact on silicon CMP may be controlled by designing preferential facets into the overburden, as by orienting the epitaxial tiles along specific crystallographic orientations.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for making a semiconductor device, comprising:
   creating a first data set, using a computer, which defines a first set of tiles for a trench chemical mechanical polishing (CMP) process;
   deriving a first trench CMP mask set and a first epitaxial growth mask set from the first data set, wherein the first epitaxial growth mask set is derived from the first data set by removing a subset of the tiles defined by the first data set and incorporating the subset of tiles into the first epitaxial growth mask set; and
   reconfiguring the first trench CMP mask set to account for the first epitaxial growth mask set, thereby defining a second trench CMP mask set.

2. The method of claim 1, wherein the step of creating the first data set includes the step of optimizing the first set of tiles defined therein for trench CMP.

3. The method of claim 2, wherein the step of reconfiguring the first trench CMP mask set to account for the first epitaxial growth mask set includes the step of re-optimizing the first trench CMP mask set to compensate for the removal of the subset of tiles.

4. The method of claim 3, wherein the first trench CMP mask set is re-optimized by changing the dimensions of some of the tiles defined therein.

5. The method of claim 3, wherein the first trench CMP mask set is re-optimized by changing the dimensions of some of the tiles defined therein which are adjacent to tiles belonging to the subset of tiles.

6. The method of claim 1, wherein the subset of tiles is selected to optimize the first epitaxial growth mask set.

7. The method of claim 1 wherein, after the subset of tiles is selected, the orientation of some of the tiles within the subset is modified.

8. The method of claim 1 wherein, after the subset of tiles is selected, the orientation of some of the tiles within the subset is modified, thereby defining a second epitaxial growth mask set.

9. The method of claim 8, wherein some of the tiles in the second epitaxial growth mask set are aligned along a first major axis.

10. The method of claim 9, wherein the first major axis is not parallel to a major axis of the trench CMP tiles in the second trench CMP mask set.

11. The method of claim 8, further comprising:
    using at least one of the second epitaxial growth mask set and the second trench CMP mask set to fabricate a semiconductor device.

12. The method of claim 8, further comprising:
    using both of the second epitaxial growth mask set and the second trench CMP mask set to fabricate a semiconductor structure.

13. The method of claim 12, wherein the semiconductor structure is a CMOS structure.

14. The method of claim 12, wherein the second trench CMP mask set is used to fabricate a first plurality of trenches in the semiconductor structure, after which the second epitaxial growth mask set is used to grow epitaxial features on the semiconductor structure.

15. The method of claim 14, wherein the first plurality of trenches are backfilled with an oxide.

16. The method of claim 15, wherein the semiconductor structure comprises a semiconductor substrate, an SOI layer, and a dielectric layer disposed between the SOI layer and the substrate.

17. The method of claim 16, wherein the step of using the second epitaxial growth mask set to grow epitaxial features on the semiconductor structure includes using the second epitaxial growth mask set to define a second plurality of trenches, and wherein each of the second plurality of trenches is disposed within one of the first plurality of trenches and exposes a portion of the substrate.

18. The method of claim 17, further comprising the step of epitaxially growing the exposed portion of the substrate.

19. The method of claim 9, further comprising:
using the second trench CMP mask set to fabricate a semiconductor device.

20. A method for making a semiconductor device, comprising:
creating a first data set, using a computer, which defines a first set of tiles optimized for a trench chemical mechanical polishing (CMP) process;
deriving a first trench CMP mask set and a first epitaxial growth mask set from the first data set, wherein the first epitaxial growth mask set is derived from the first data set by removing a subset of the tiles defined by the first data set and incorporating the subset of tiles into the first epitaxial growth mask set; and
re-optimizing the first trench CMP mask by adjusting the dimensions of some of the tiles defined therein.

* * * * *